(12) United States Patent
Lindholm

(10) Patent No.: US 6,883,312 B2
(45) Date of Patent: Apr. 26, 2005

(54) WATER COOLED EXHAUST TUBE

(76) Inventor: Jan Lindholm, Östanåvägen 90, S-810 70 Älvkarleby (SE)

( * ) Notice: Subject to any disclaimer, the term of this patent is extended or adjusted under 35 U.S.C. 154(b) by 0 days.

(21) Appl. No.: 10/362,769

(22) PCT Filed: Aug. 28, 2001

(86) PCT No.: PCT/SE01/01821
§ 371 (c)(1),
(2), (4) Date: Jul. 29, 2003

(87) PCT Pub. No.: WO02/18752
PCT Pub. Date: Mar. 7, 2002

(65) Prior Publication Data
US 2004/0026070 A1 Feb. 12, 2004

(30) Foreign Application Priority Data
Aug. 28, 2000 (SE) .............................................. 0003028

(51) Int. Cl.⁷ .............................................. F01N 3/00
(52) U.S. Cl. .......................................... 60/298; 60/320
(58) Field of Search .......................... 60/298, 310, 320; 165/154, 156

(56) References Cited

U.S. PATENT DOCUMENTS 4,258,782 A * 3/1981 Kao ........................ 165/109.1
5,125,691 A * 6/1992 Bogdan .................... 285/122.1
5,408,827 A    4/1995 Holtermann et al.
5,531,620 A * 7/1996 Ozawa et al. ............. 440/89 R
5,740,670 A * 4/1998 Woods ........................ 60/310
RE36,888 E  * 10/2000 Sougawa et al. ............. 60/302
6,662,555 B1 * 12/2003 Ishii ............................ 60/302

FOREIGN PATENT DOCUMENTS

| | | |
|---|---|---|
| DE | 195 02 959 C1 | 8/1996 |
| DE | 297 05 767 U1 | 10/1997 |
| GB | 2 297 531 A | 8/1996 |
| JP | 11-200837 | 7/1999 |

* cited by examiner

Primary Examiner—Thomas Denion
Assistant Examiner—Diem Tran
(74) Attorney, Agent, or Firm—Albihns Stockholm AB; Reginald Finn

(57) ABSTRACT

Combustion engine (M), especially an Otto engine or diesel engine for land and water vehicles, has an exhaust system with an exhaust catalyst (20), integrated in the exhaust pipe (L), and a catalyst cooling device (26) fed with a fluid or pasty coolant (14), preferably water, glycerin or a gel. Also claimed is a silencer, especially for the above combustion engine, having a silencer cooling device fed with a fluid or pasty coolant. Preferably, the cooling device (26) forms a housing (G) for the catalyst (20) or silencer, respectively.

13 Claims, 4 Drawing Sheets

Figure 3:
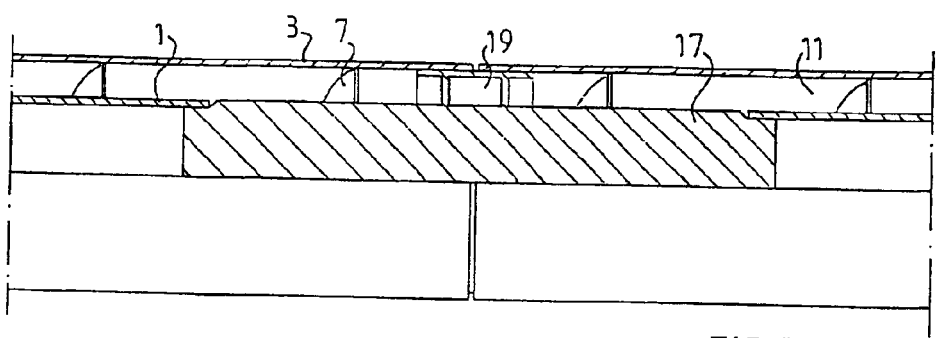

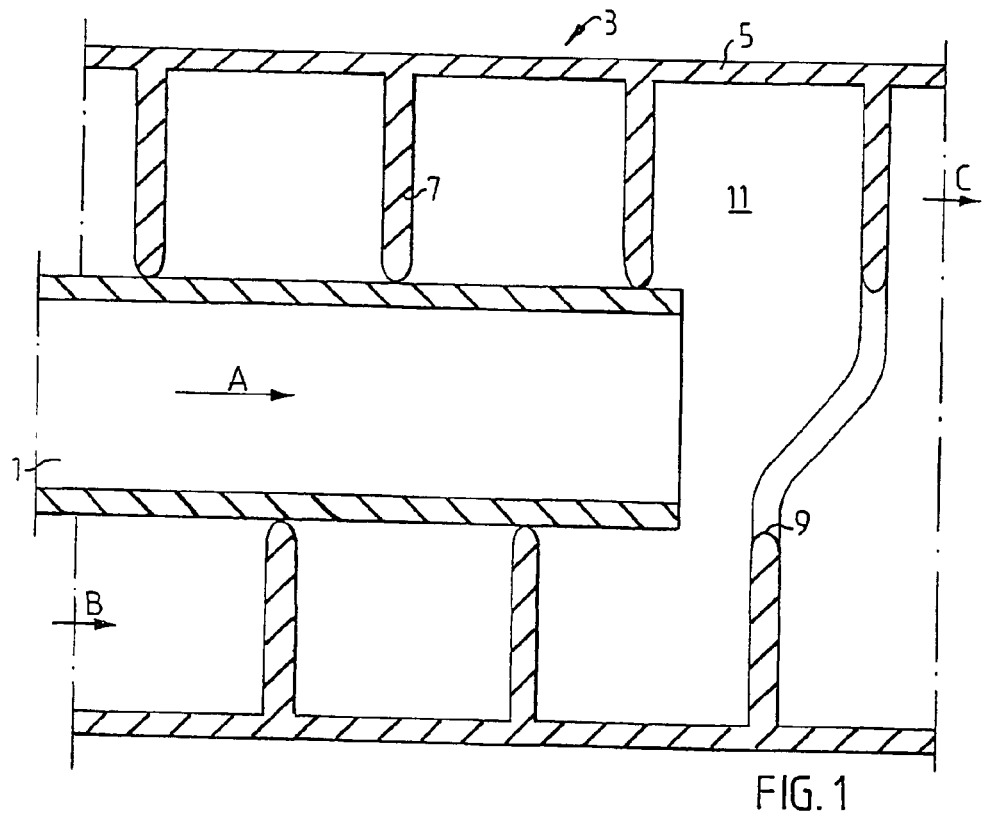
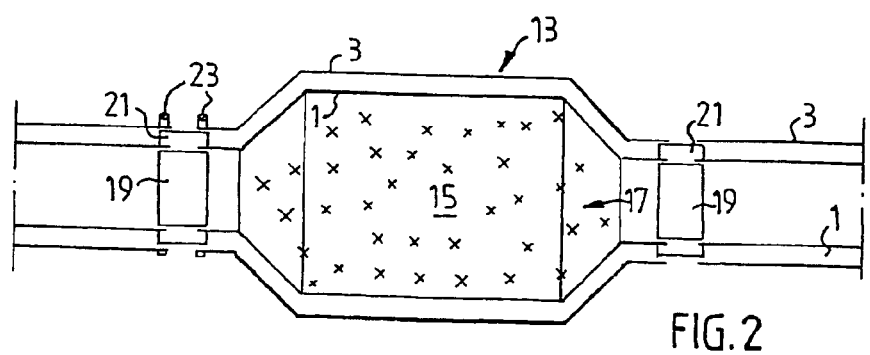

WATER COOLED EXHAUST TUBE

The present invention relates to an exhaust tube for conducting exhaust gases from a combustion engine, at which the exhaust gases are cooled by means of water. Primarily, but not exclusively, the invention concerns exhaust tubes from boat engines.

In order to prevent the exhaust tube from a boat engine from becoming so hot that big difficulties arise concerning its placement in the boat, it is desirable to cool the exhaust gases. A commonly used known way to do this is to inject water into the exhaust tube a short distance downstream of the engine. Depending on how this injection is done several problems arise.

On boats the exhaust outlet is often located at the stern, or on a side of the boat hull, whereby the outlet is located relatively low. A reason for this that the outlet has to be placed lower than the engine, or at least the exhaust thereof, in order to prevent cooling water, injected into the exhaust tube to cool the exhaust gases, from being forced by gravity back into the engine, which would be the case if the outlet is located higher than the engine.

A problem often occurring on boats having the exhaust outlet located at the stern or on a side of the boat hull is that during engine operation exhaust gases discharged from the outlet often temporarily remain in the region around the outlet, and can cause discomfort and even be unhealthy for passengers on the boat. In particular a problem arises on a boat with the exhaust outlet on the stern. When the boat is in engine powered motion the airflow around the boat often presents a wake at the stern. This can cause exhaust gases to remain at the stern and even spread up on the aft part of the deck.

The object of the invention is to present an exhaust tube, which avoids these problems, but has an acceptably low temperature. According to the invention this is accomplished with an exhaust tube presenting the characterizing features in claim 1.

Thus, a channel is formed between the housing and the inner tube, conducting the cooling water separately from the exhaust gases, flowing through the inner tube. The dimensions of the channel and the flow of the cooling water are adapted to the temperature of the exhaust gases and the material in the housing and the inner tube, so that the external temperature of the housing obtains an acceptably low level during operation.

Preferably, a channel having a screw line shape wrapping the inner tube is provided between the inner tube and the housing. This provides for securing that high regions of the cross-section of the exhaust tube is provided with cooling water as well as low regions thereof.

The construction allows for the housing as well as the inner tube to be made flexible, and for either one, preferably both of them, is made in rubber. Thus, the inner tube can constitute a rubber hose.

Having the inner tube, the outer housing and the cam made in a flexible material allows for the installation of the exhaust tube in its environment, for example a boat, to be done in a much simpler way than what would be the case with a non-flexible material. Allowing the exhaust tube to flex when installed eliminates the need for adapting the length of exhaust tube sections to relatively close tolerances. Additionally, tube bending and other installation preparation tasks would be eliminated.

Tests have shown that arranging the exhaust tube with a water jacket around the inner tube and using rubber material for the exhaust tube provides excellent sound dampening qualities. A water jacketed exhaust tube using metal such, as stainless steel, for the inner tube and housing provides some silencing effect compared to a single tube exhaust pipe, according to known art, but the silencing quality is greatly reinforced, if the water jacket is combined with a flexible material for the exhaust tube.

The inner tube is affected by the hot exhaust gases. According to a preferred embodiment of the invention, the inner tube is arranged to be replaceable in the housing. This means that it can be made out of a cheap material and be replaced when needed, without the outer housing and the cam having to be replaced at the same time.

In an embodiment of the exhaust tube, especially suitable for boats, the cam is made in rubber integrated with the housing on the interior of the wall of the housing. Thereby, the outer housing and the cam can be manufactured as one unit. Alternatively, the cam can be formed as a separate element. The cam can also be formed on the exterior of the inner tube. An inner tube and a cam integrated on its exterior provides for a unit which greatly facilitates a rubber manufacturing process thereof.

According to a further development of the invention the exhaust tube can be carried out as a silencer. The silencer can be included as a shorter section, formed with a larger diameter, of a longer exhaust tube according to the invention, or be connected to an exhaust tube of another kind. A big advantage with such a silencer is that an uninterrupted cooling water flow is obtained, i.e. the cooling water flow from the exhaust tube located upstream of the silencer continues around the silencer and onward downstream of the latter. This means that the silencer becomes cooler, and no separate conduits are required for the cooling water.

Since the silencer water-jacketed the silencing becomes very effective, especially if all components included are made in rubber. However, as mentioned above, the rest of the exhaust tube has, without any special sound dampening means in it, a sound dampening effect, especially when formed entirely in rubber.

For boats and other installations, in which the exhaust tube has an essentially horizontal orientation, the screw line shaped cooling water channel is advantageous, since it forces the water to flow through elevated parts of the exhaust tube, so that no parts of the exterior of the inner tube end up having no cooling. However, even if the exhaust tube according to the invention has special advantages in boats, the invention is not limited to these, rather it can be applied, e.g. in small stationary or mobile set-ups with a combustion engine, such as compressors or reserve power stations, at which the exhaust tube possibly partly can be in the form of a vertical chimney.

In the description and in the claims, the expression "rubber" shall be understood in a wide sense and be regarded to comprise also other highly elastic, materials similar to rubber apart from rubber. For different types of usable materials similar to rubber we refer to, e.g. Ullman, Encyclopedia of Industrial Chemistry, Fifth Completely Revised Edition, pp 242–243.

Figure 4:
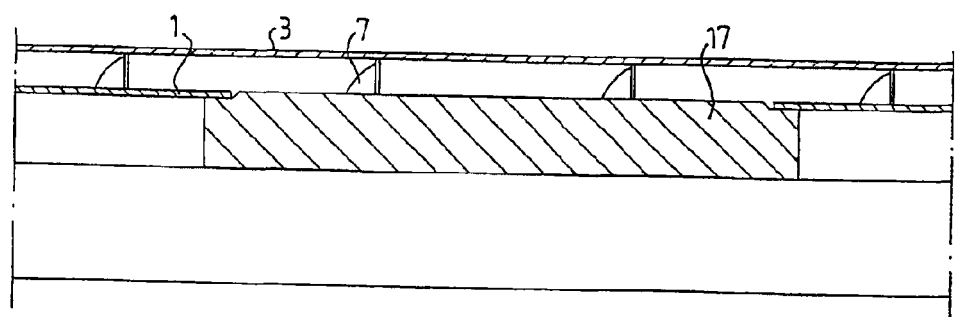
Figure 5:
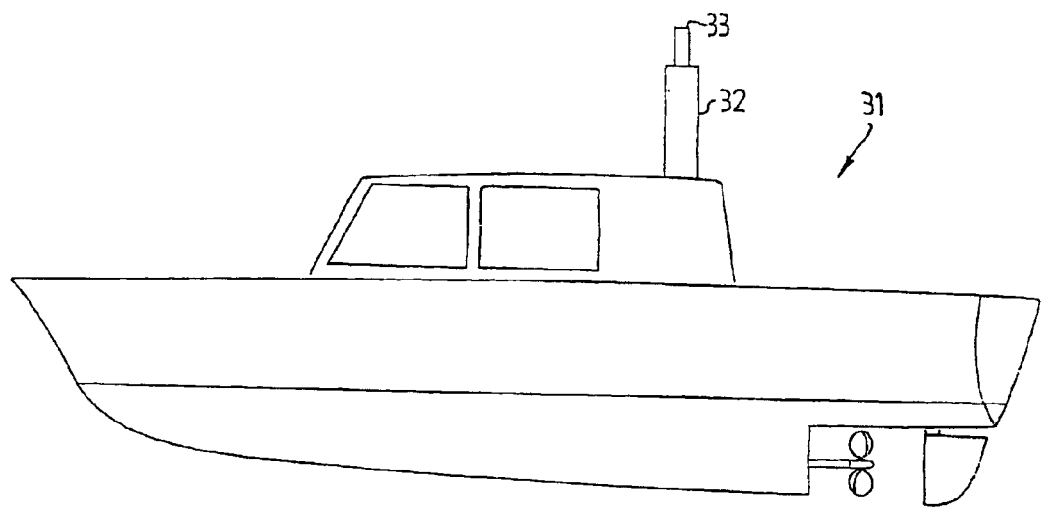
Figure 7:
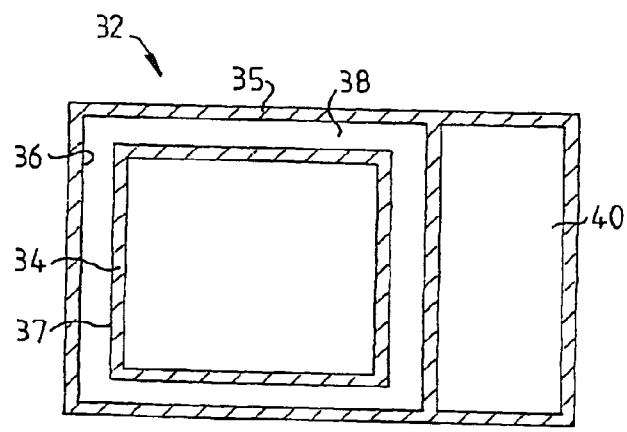
Figure 6:
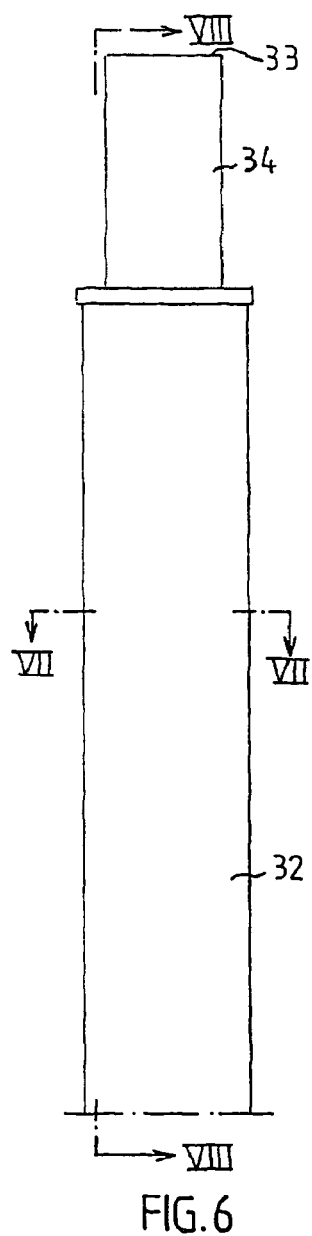
Figure 8:
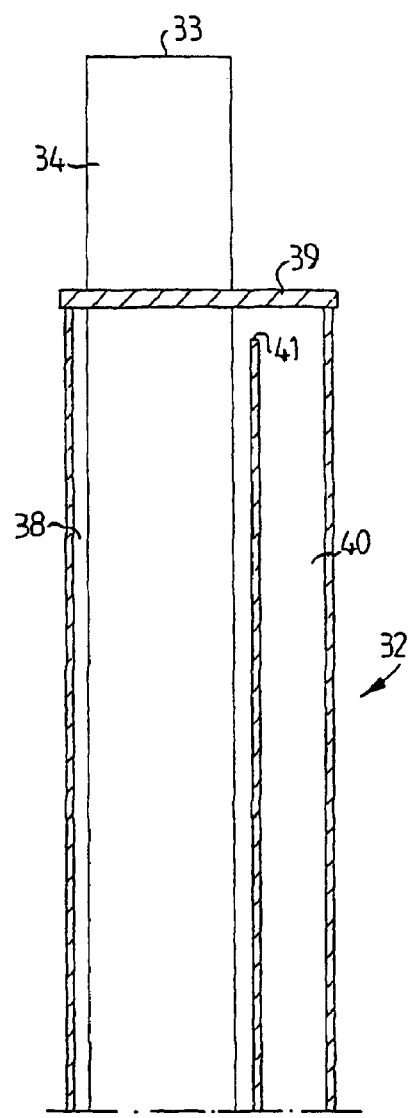

The invention will be described closer below with reference to the accompanying drawing, in which FIG. 1 shows a longitudinal cross-section through a part of an exhaust tube according to one embodiment of the invention, FIG. 2 shows schematically a sectioned part of an exhaust tube with a silencer section according to another embodiment of the invention, FIG. 3 shows schematically a partially sectioned part of an exhaust tube with a silencer section according to yet another embodiment of the invention, FIG. 4 shows schematically a partially sectioned part of an exhaust tube with a silencer section according to a further embodiment of the invention, FIG. 5 shows a boat equipped with an exhaust tube according to an additional embodiment of the invention, FIG. 6 shows a part of the exhaust tube according to the additional embodiment of the invention, FIG. 7 shows a cross-section of the exhaust tube according to the additional embodiment of the invention, the cross-section being located at the line VII—VII, and FIG. 8 shows a view of the exhaust tube according to the additional embodiment of the invention, sectioned along the line VIII—VIII in FIG. 6.

The exhaust tube shown in cross-section in FIG. 1 is manufactured entirely in rubber and is constituted by an inner tube 1 in the form of a hose, as well as an outer housing 3, surrounding the inner tube. Both the rubber hose 1 and the housing 3 are circularly cylindrical and mutually arranged coaxially. A cam 7 is arranged on the interior of the wall 5 of the housing 3, which cam extends substantially in a perpendicular angle to the wall 5 and radially towards the inner tube 1. The cam has a rounded top 9 and the height of the cam from the wall 5 corresponds substantially to half the difference between the inner diameter if the housing wall 5 and the outer diameter if the inner tube 1. Additionally, the cam 7 extends in a screw line shaped manner along the exhaust tube in the space between the inner tube 1 and the housing 3. The top 9 of the cam 7 forms a ridge, which, along a screw line, sealingly abuts the exterior of the inner tube 1. Thereby, a screw line shaped channel 11 is formed in this space.

The cam 7 can also be integrated with the inner tube and located on the exterior thereof. In this case also, the cam could have a ridge on the top 9 for sealing abutment against the interior of the housing.

According to an alternative, more than one cam 7, preferably three cams, can be provided between the inner tube and the housing, in turn creating a corresponding number of channels 11. Also, the cam, or cams could, instead of presenting a screw line shape, extend straight in the axial direction of the exhaust tube. Multiple channels 11 provides for securing that high regions of the cross-section of the exhaust tube are provided with cooling water as well as low regions thereof.

As a further alternative, the cam 7, or cams, could be divided into axially separated sections, to form guides for the water flow along limited sections of the exhaust tube. In a special version of this alternative the cams would take the form of blades, each of which exerts a force upon the flowing water, causing it to rotate. Combined with the integration of the blades on either the inner tube or the housing, this would lead to less friction when the inner tube and the housing are moved in relation to each other during assembly or disassembly operations of the exhaust tube.

When installed, the inner tube 1 is connected is a suitable way, not shown, to the exhaust outlet of the engine. The exhaust gases flow through the inner tube 1 in the direction of the arrow A. The other end of the inner tube 1 can be connected to another exhaust tube, a silencer or, in a boat, emerge through the stern of the boat. Cooling water is conducted into the channel 11 at one end of the inner tube 1, shown in FIG. 1 by the arrow B. The cooling water then flows in a screw line shaped manner in the channel 11 around the inner tube 1 and along the latter in the same longitudinal direction as the exhaust flow A, to be discharged at last, in a manner not shown, from the exhaust tube at another place, here indicated with the arrow C.

I FIG. 2 a further development of the invention is shown, in which the exhaust tube within a limited longitudinal section 13 forms a silencer. Within the section 13 the housing 3 as well as the inner tube 1 are formed with a larger diameter than elsewhere in the exhaust tube. Thereby, the inner tube 1 forms a cylindrical chamber 15, but this as well is surrounded at a distance by the outer housing 3 and the cam 7, which extends in a screw line shaped manner in the space between the housing and the inner tube. Within the chamber 15 silencing means are arranged. These could be of a conventional known type, for example division walls provided with holes, or, as indicated in FIG. 2, a filling material adapted to let gases pass or a porous mass 17.

Suitably, in the silencer section 13 all components, the inner tube 1, the cam 7 as well as the housing 3, are made in rubber. However, for certain applications it can be advantageous to combine components in different materials, or to make all components in a material different than rubber, e.g. steel. For example, a cylindrical silencer with a single steel jacket can be covered with an outer housing in rubber, having a screw line shaped cam on the inside. The important thing is that a water jacket with a screw line shaped cooling water channel is created, by which sound dampening as well as cooling is obtained.

FIG. 2 shows that the axial ends of the longitudinal section 13 are made with the same diameters as the rest of the exhaust tube. The joining of the section 13 to the rest of the parts of the exhaust tube can be done in a suitable way. For example, a sleeve coupling 19 in metal, e.g. stainless steel, be arranged inside the inner tube 1. The diameter of the sleeve coupling 19 is selected so that an inner tube 1 in rubber can be struggled onto the sleeve coupling and remain on the sleeve coupling by its elastic force. In a corresponding manner, the end of the outer housing 3 can be struggled onto a sleeve coupling 21 situated therein. This is shown in the right part of FIG. 2. The left part of FIG. 2 shows a corresponding joint, at which, however, tube clamps 23 are arranged on the exterior of the housing 3, above the sleeve coupling 21 to accomplish a stronger connection. If so desired, tube clamps can also be arranged around the inner tube 1 to clamp the latter against the sleeve coupling 19.

Joints corresponding to the ones showed in FIG. 2 can also be used to join to evenly thick sections of the exhaust tube. Hereby, a change to another material can be done for the inner tube 1, the housing 3 or both. For example, close to the engine, the inner tube 1 can be made of a metal braid, but at a distance from the engine it can be joined with a cheaper, simple rubber hose.

FIG. 3 shows a part of an exhaust tube with a silencer section according to yet another embodiment of the invention. Here a silencing means 17, extends in essentially the same direction as an inner tube 1 of the exhaust tube. Additionally, it has a similar cross-section as the inner tube 1. It could be of a conventional known type, i.e. a filling material adapted to let gases pass, a porous mass, or presenting with division walls provided with holes.

This means that an outer housing 3, delimiting a channel for conducting cooling water, can extend throughout the part of the exhaust tube presenting the silencing means with a constant cross-section. Also, a cam 7 can be used as described above, at which the "screw" formed by the cam 7 will have a constant diameter throughout if part with the silencing means. This will allow for a silencer with a simple design, having fewer parts than silencers according to known art, and in turn, will be cheap in production.

In FIG. 3, the inner tube 1 is discontinued at the silencing means 17, at which the inner tube is joined to the silencing means 17 by overlapping the silencing means at the ends of the latter. A press fit can provide a mounting force between the silencing means and the inner tube. Alternatively, a hose clamp can be used to secure the inner tube 1 to the ends of the silencing means 17. As a further alternative the inner tube 1 can extend pass the entire silencing means 17, or a part of the latter.

In FIG. 3, the housing 3 is divided at the silencing means 17, at which two ends of the housing 3 are joined by means of a sleeve coupling 19, similar to the one described above with reference to FIG. 2.

FIG. 4 shows an alternative to the embodiment shown in FIG. 3. Here a outer housing 3 extends uninterrupted along a section of the exhaust tube containing a silencing means 17, similar to the one described with reference to FIG. 3. Additionally, a cam 7 also extends uninterruptedly pass the silencing means 17. This provides for a very simple construction, at which no special parts are needed for the housing 3 and the cam 7 at the silencing means 17. Also, assembly of the exhaust tube will be very easy, since the housing 3 and the cam 7 can be placed over the silencing means in the same manner as they would over any other part of the inner tube 1. The arrangement shown in FIG. 4 also makes maintenance and replacement of the silencing means easy.

Although the exhaust tubes in the embodiments described above present circular cross-sections, other cross-sectional shapes can be used, e.g. square, rectangular etc. Additionally, instead of being coaxial the inner tube 1 can be located off-center in the housing 3.

FIG. 5 shows a power boat 31. The exhausts from an engine in the boat 31 are conducted through an exhaust tube 32 having in an essentially vertical orientation. The exhaust tube 32 is adapted to conduct exhaust gases upwards towards an outlet 33 at the top. The outlet 33 is located above the hull and deckhouse of the boat, and also above any passenger. Thereby the exhausts are discharged in air moving in relation to the boat, during operation of the latter, and also at a distance from the passengers.

The exhaust tube 32 comprises an inner tube 34, shown in cross-section in FIG. 7, adapted to guide the exhaust gases. At an upper end of the inner tube 34 the outlet 33 is formed. An outer housing 35 surrounds the inner tube 34. In FIG. 7 the inner tube and the housing have rectangular cross-sections, but alternative cross-sections can be used, e.g. circular, elliptical, square, or other. Also the inner tube 34 and the housing 35 can present mutually differently shaped cross-sections.

In FIG. 7 the inner tube 34 is oriented coaxially to the housing 35 and an inner face 36 of the housing is located at a distance from an outer face 37 of the inner tube 34, whereby a cooling channel 38 is formed. The cooling channel 38 extends along the inner tube 34 and around the latter. It is adapted to conduct cooling water for cooling the exhaust tube. An alternative arrangement could comprise more than one cooling channel distributed around the inner tube and separated by walls or cams.

Referring to FIG. 8, the cooling channel 38 communicates with a water pump (not shown), which is adapted to pump water upwards through the cooling channel 38. At an upper end of the cooling channel an end wall 39 is located. The inner tube 34 extends through the end wall 39. Alternatively, the outlet 33 is located by the end wall 39.

A return channel 40, shown in FIGS. 7 and 8, extends in the same direction as the rest of the exhaust tube 32. I is located on one side of the housing 35. The return channel 40 is at its top end delimited by the end wall 39, and communicates at a low region with the water pump. As can be seen in FIG. 8, the cooling channel 38 and the return channel 40 communicate via an opening 41 at the respective top ends of the channels 38, 40. Water is pumped, by means of the water pump, upward in the cooling channel 38. When the water reaches the top of the cooling channel 38 it passes through the opening 41 and is gravity fed downward in the return channel 40. Alternatively, water can be pumped upwards in the return channel 40 and conducted downwards in the cooling channel.

The cooling channel 38 could communicate with a screw line shaped channel 11 of a portion of the exhaust tube, similar to the one described above with reference to FIG. 1. The material for the exhaust tube in FIGS. 5–8 can the any suitable material, such as stainless steel. Alternatively, a flexible material, such as rubber can be used, to allow for the exhaust tube to be more easily installed in a variation of environments.

As an alternative, the inner tube 34 does not have to be coaxial with the outer housing 35, but can have a cross-section with a center located apart from the center of the cross-section of the housing 35.

An additional feature of the exhaust tube in FIGS. 5–8 can be a cam 7 similar to what has been described above with reference to FIG. 1. The cam would extend in a spiral shaped manner along the exhaust tube, and span between the inner tube 34 and the housing 35. The cam would secure, especially in a case where the exhaust tube is oriented in an angle from the vertical direction, that all sides of the exhaust tube would be provided with cooling water.

The arrangement described with reference to FIGS. 5–8 allows for an exhaust tube for water cooled exhaust gases to be oriented so that the outlet is located above the engine. The water jacket provided around the inner tube provides for the external temperature of the exhaust tube to be considerably lower than in a conventional exhaust tube. This means that temperature of the outer face of the exhaust tube can be low enough for the latter to be extended through areas where it otherwise would have caused heat problems for materials, structures and persons.

With the described arrangement the exhaust tube can be located, e.g. on the deck of a boat without causing the risk of persons on deck to burn themselves on the exhaust tube. The exhaust tube can also be extended through an internal space of the boat, which space could be intended for passengers, without causing the risk of these passengers to burn themselves or for any interior or loose parts to catch fire. Additionally, the exhaust tube can be integrated in a structure on the top of the boat, such as a stand for antennas and lanterns, or a rigging for sails, without causing heating problems for the structure.

What is claimed is:

1. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one channel, formed between the housing and the inner tube, is adapted to conduct cooling water separately from the exhaust gases, the inner tube extending coaxially in the housing, the exhaust tube comprising at least one cam, spanning the distance between the housing and the inner tube, the cam extending in a screw line shaped manner in the longitudinal direction of the housing, whereby the channel extends in a screw line shaped manner between the housing and the inner tube.

2. An exhaust tube according to claim 1, wherein the cam is arranged on the interior of the wall of the housing, the cam being made in rubber, the top of the cam, in a cross-sectional view, being rounded to form a ridge for a sealing abutment against the exterior of the inner tube.

3. An exhaust tube according to claim 2, wherein the inner tube is replaceable in the housing.

4. An exhaust tube according to claim 1, wherein the cam is arranged on the exterior of the wall of the inner tube, the cam being made in rubber, and the top of the cam, in a cross-sectional view, being rounded to form a ridge for a sealing abutment against the interior of the housing.

5. An exhaust tube according to claim 4, wherein the inner tube is replaceable in the housing.

6. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one channel, formed between the housing and the inner tube, is adapted to conduct cooling water separately from the exhaust gases, the inner tube extending coaxially in the housing, the exhaust tube comprising a plurality of cams, spanning the distance between the housing and the inner tube, the cams extending straight in the axial direction of the exhaust tube.

7. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one channel, formed between the housing and the inner tube, is adapted to conduct cooling water separately from the exhaust gases, the exhaust tube comprising at least one cam, spanning the distance between the housing and the inner tube, the cam extending in a screw line shaped manner in the longitudinal direction of the housing, whereby the channel extends in a screw line shaped manner between the housing and the inner tube, in addition to which the housing and the inner tube are flexible.

8. An exhaust tube according to claim 7, wherein the inner tube is made in rubber, in particular a rubber hose.

9. An exhaust tube according to claim 7 or 8, wherein the housing is made in rubber.

10. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one channel, formed between the housing and the inner tube, is adapted to conduct cooling water separately from the exhaust gases, the inner tube extending coaxially in the housing, the exhaust tube comprising at least one cam, spanning the distance between the housing and the inner tube, the cam extending in a screw line shaped manner in the longitudinal direction of the housing, whereby the channel extends in a screw line shaped manner between the housing and the inner tube, in addition to which silencing means are arranged in the inner tube.

11. An exhaust tube according to claim 10, wherein the screw formed by the cam has a constant diameter throughout an exhaust tube part including the silencing means.

12. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one cooling channel, formed between the housing and the inner tube, is adapted to conduct cooling water separately from the exhaust gases, the exhaust tube being adapted to be mounted in a water-vessel, to extend from a first region to a second region of the latter, the second region being located higher than the first region, whereby the housing delimits the at least one cooling channel surrounding the inner tube, whereby water pump means are provided to pump water for it to flow through the cooling channel, wherein the outlet of the exhaust tube is located above or at a top end of the cooling channel, and wherein a water transportation channel communicates with the cooling channel at the top end of the cooling channel and at a top end of the water transportation channel, so that water, upon reaching the top of the cooling channel is gravity fed downward in the water transportation channel.

13. An exhaust tube for conducting exhaust gases from a combustion engine, whereby the exhaust gases are cooled by means of water, wherein the exhaust tube comprises an outer housing formed as a tube, and an inner tube extending at a radial distance from the housing, the inner tube being adapted to conduct the exhaust gases while at least one cooling channel, formed between the housing and the inner tube, is adapted to conduct cooling water separately from the exhaust gases, the exhaust tube being adapted to be mounted in a water-vessel, to extend from a first region to a second region of the latter, the second region being located higher than the first region, whereby the housing delimits the at least one cooling channel surrounding the inner tube, whereby water pump means are provided to pump water for it to flow through the cooling channel, wherein the outlet of the exhaust tube is located above or at a top end of the cooling channel, and wherein a water transportation channel communicates with the cooling channel at the top end of the cooling channel and at a top end of the water transportation channel, so that water can be pumped upwards in the water transportation channel and conducted downward in the cooling channel.

* * * * *